Figure 1:
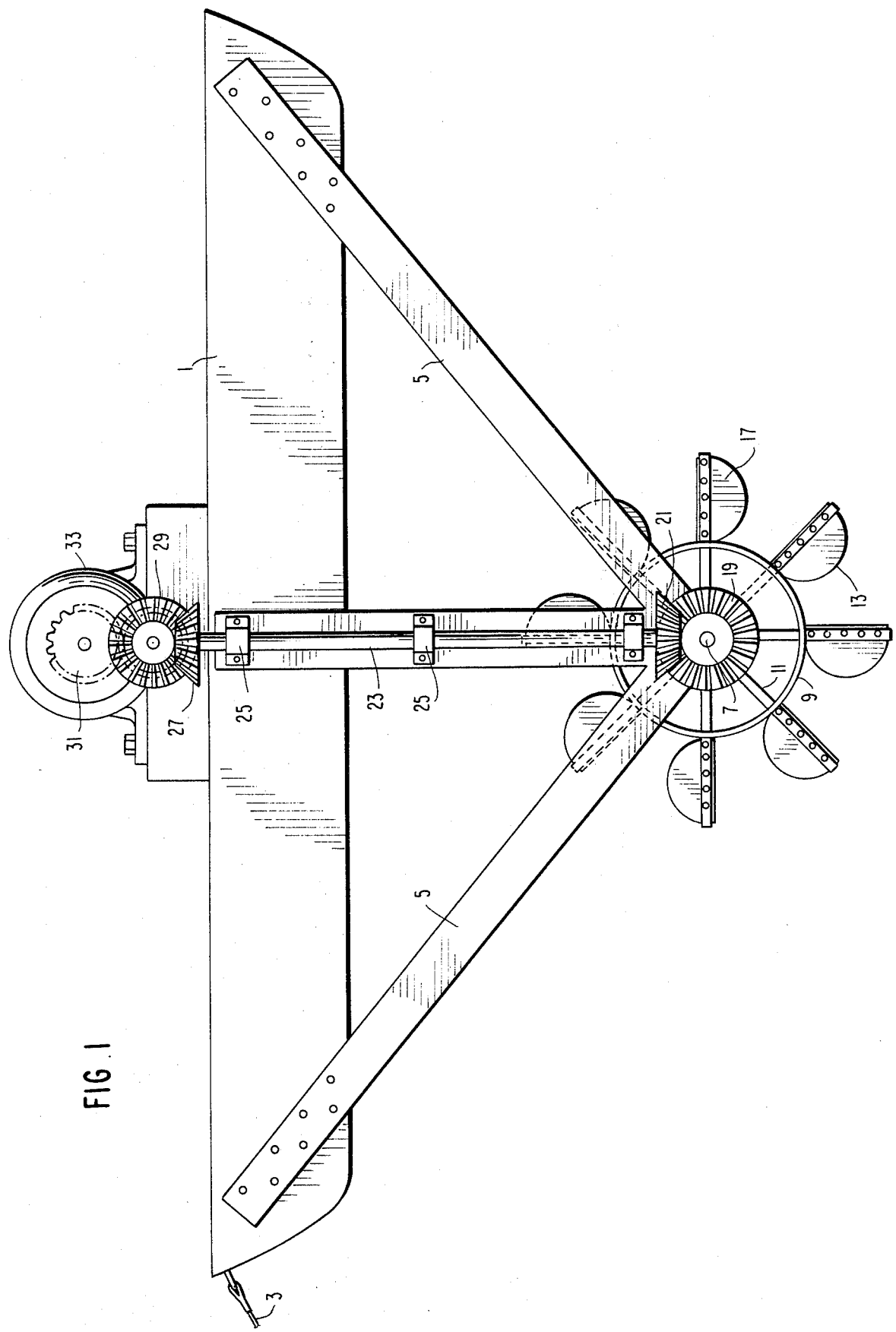

United States Patent [19]

Slonim

[11] 4,359,868
[45] Nov. 23, 1982

[54] OCEAN WAVE ENERGY CONVERTER

[76] Inventor: David M. Slonim, P.O. Box 3312, West Palm Beach, Fla. 33402

[21] Appl. No.: 272,342

[22] Filed: Jun. 10, 1981

[51] Int. Cl.³ .............................................. F03B 13/12
[52] U.S. Cl. ...................................... 60/501; 60/497; 415/7
[58] Field of Search ........................ 60/495, 497, 501; 415/7; 290/53, 54

[56] References Cited

U.S. PATENT DOCUMENTS

| 647,638 | 4/1900 | Todd | 415/7 |
| 889,153 | 5/1908 | Roehr | 290/53 |
| 937,712 | 10/1909 | McFarland, Jr. | 60/501 |
| 3,965,364 | 6/1976 | Gustafson et al. | 290/53 |
| 4,170,738 | 10/1979 | Smith | 290/42 |
| 4,208,876 | 6/1980 | Tsubota | 60/495 |

FOREIGN PATENT DOCUMENTS 2254983  7/1975  France .................................. 290/53

Primary Examiner—Allen M. Ostrager
Attorney, Agent, or Firm—Young & Thompson

[57] ABSTRACT

A device for converting the energy of ocean waves into electricity, comprises a buoyant body that floats on the surface of the water and rises and falls with the waves. Fixedly secured to the buoyant body at a depth in the region of still water not affected by the waves, is a bucket wheel or bucket chain which will accordingly rise and fall with the buoyant body. But as the water surrounding the bucket wheel or chain is still, the wheel or chain will be caused to rotate or circulate, respectively. This movement of the wheel or chain is transmitted to a generator or other energy conversion device on the buoyant body, and thence to shore.

4 Claims, 2 Drawing Figures

OCEAN WAVE ENERGY CONVERTER

The present invention relates to apparatus for converting the energy of ocean waves to another form of energy, e.g. electricity.

The present invention is based on the fact that ocean waves are of only finite depth, that is, the surface of the ocean may be in violent motion because of wave action, at the same time that the water at a certain depth will be relatively calm.

The present invention takes advantage of this difference in kinetic energy of the water at the surface and the water at a substantial depth, by providing a buoyant member that moves with the surface water and imparts that same movement to a member at a depth at which the water is relatively calm. The member at that depth is mounted for circulation under the influence of the inertia of the calm water; and this circulation is converted into another form of energy, e.g. electricity.

More particularly, the member that circulates in reaction to the inertia of the relatively calm water, is in the form of a bucket wheel or endless bucket chain, the buckets being so shaped as to move relatively easily through the water in one direction but only with great difficulty in the other direction. As a result, the bucket wheel will always turn in the same direction, or the bucket chain will always circulate in the same direction, regardless of the direction of the movement to which it is subjected by the movements of the buoyant body under the influence of the waves.

It is accordingly an object of the present invention to provide an ocean wave energy converter, which can extract energy from ocean waves of any size, and in fact, the higher the better.

Another object of the invention is to provide an ocean wave energy converter that can be installed near the shore, and in fact in any location in which the depth of the ocean is at least twice the height of the highest wave.

Still another object of the present invention is an ocean wave energy converter that is well adapted to modular construction.

Finally, it is an object of the present invention to provide an ocean wave energy converter, which will be relatively simple and inexpensive to construct, easy and cheap to maintain, and rugged and durable in use.

Figure 2:
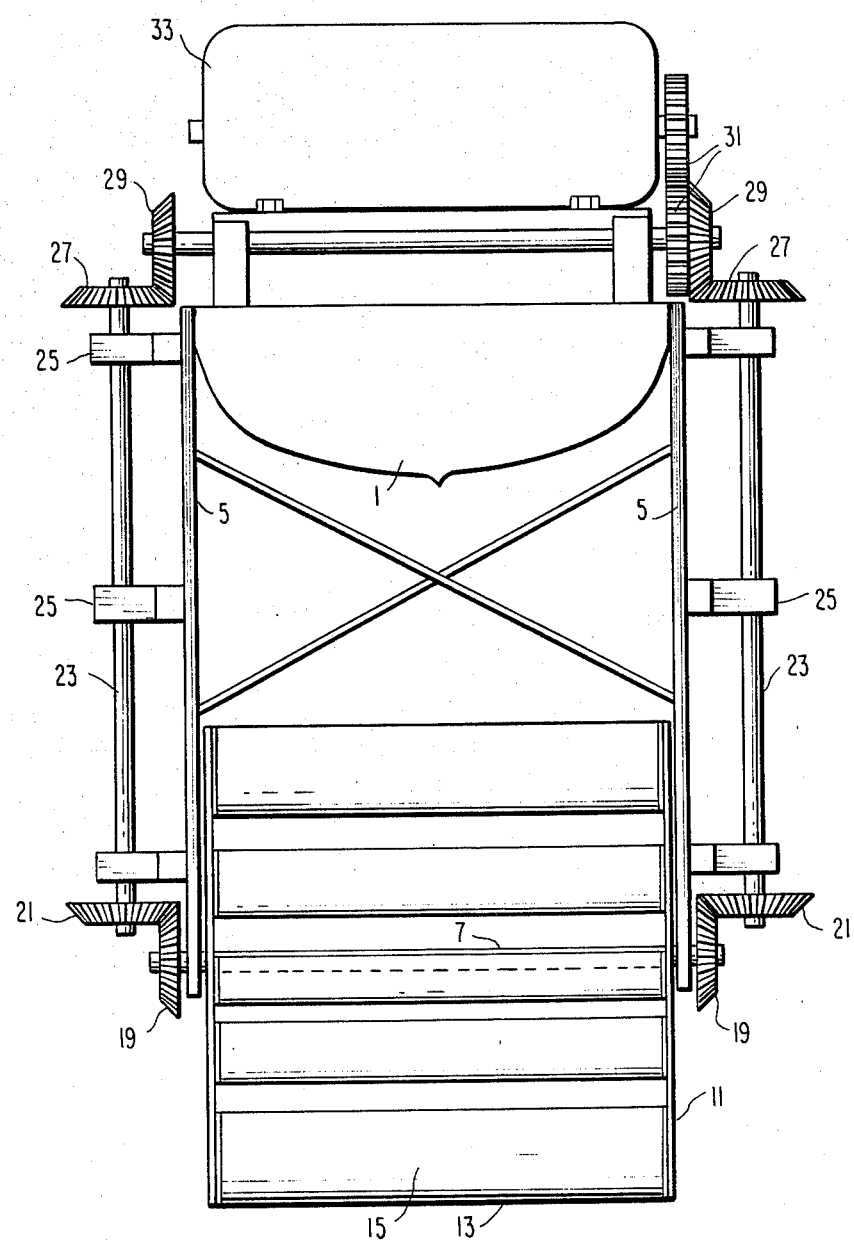

Other objects, features and advantages of the present invention will become apparent from a consideration of the following description, taken in connection with the accompanying drawings, in which:

FIG. 1 is a side elevational view of an ocean wave energy converter according to the present invention; and FIG. 2 is an end elevational view thereof.

Referring now to the drawings in greater detail, there is shown an ocean wave energy converter according to the present invention, comprising a buoyant body 1 such as a boat or the like, moored to an anchor or the shore by a line 3 so that it is free to float on the surface of the water and free to rise and fall with the wave action, and free to assume a position in the water in which its length extends perpendicular to the waves.

Fixedly secured to and depending downwardly from body 1 is a rigid framework 5 which at its lower end supports for rotation a horizontal shaft 7. Fixedly mounted on shaft 7 for rotation about a horizontal axis, is a bucket wheel 9 comprised by a plurality of radially outwardly extending arms 11 disposed at each end of bucket wheel 9, each pair of arms 11 fixedly carrying between them an elongated bucket 13. Each bucket 13 has a semi-cylindrical wall 15 comprising the side and bottom walls of the bucket, and is closed at its ends by opposite end walls 17. Each bucket 13 is thus open on one side and closed on all the others.

All the buckets 13 open in the same direction, which is the counterclockwise direction as seen in FIG. 1. It will therefore be appreciated that the buckets on one side of the wheel offer a different resistance to the water than the buckets on the other side of the wheel, depending on the direction in which the bucket wheel is moving through the water. Thus, with the buckets arranged as in FIG. 1, it will be evident that, as the bucket wheel moves downward through relatively calm water, the buckets on the left side of the wheel will offer greater resistance to the water than will the relatively streamlined buckets on the right side of the wheel, which present their rounded surfaces to the oncoming water. The result is that the wheel will rotate clockwise when it is forced down into calm water.

When the wheel is dragged back up through calm water, toward the surface, however, then the buckets on the right side of the wheel as seen in FIG. 1 offer greater resistance to the water than do those on the left side of the wheel; so again, the wheel tends to turn clockwise.

In other words, with the buckets arranged as in FIG. 1, both downward movement of the wheel and upward movement of the wheel tend to rotate the wheel clockwise as seen in FIG. 1. This is a very important feature of the present invention, because it means that no energy is wasted overcoming the kinetic energy of a moving solid part of the mechanism so as to reverse its direction of rotation or circulation.

This continuous unidirectional rotary movement of the bucket wheel 13 is converted into another form of energy, e.g. electric, by a transmission train which, in the illustrated embodiment, extends above the surface of the water. Specifically, bevel gears 19 at each end of shaft 7 mesh with bevel gears 21 fixed to the lower ends of shaft 23 at each side of framework 5, the shafts 23 being mounted for rotation about their vertical axes in stanchions 25 on both sides of framework 5. Bevel gears 27 fixed to the upper ends of shaft 23 mesh with bevel gears 29, 31 mounted on buoyant body 1, to drive an electrical generator 33 supported by buoyant body 1. Electrical power from generator 33 is transmitted to shore by appropriate conductors (not shown) or is consumed onboard buoyant body 1.

Alternatively, of course, the bevel gearing 29, 31 could drive a pump or compressor or other device for storing energy hydraulically or pneumatically, for use as such or for subsequent conversion to electrical energy. Thus, for example, if the operation of generator 33 required a more constant rate of rotation than could be provided by bevel gearing 29, 31, it might in that case be desirble to interpose a compressor or the like between the bevel gearing and the generator.

In a modification (not shown), bucket wheel 9 can be replaced by an endless bucket chain whose length is preferably vertically disposed and whose buckets are caused to circulate unidirectionally and according to the same principle as in the case of bucket wheel 9.

In another modification (not shown), bevel gearing 19, 21 can be sealed in a housing to prevent corrosion or fouling.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. An ocean wave energy converter, comprising a buoyant body, a framework fixedly secured to the buoyant body and extending to a depth substantially free from wave action, bucket means disposed in a series in a closed path and mounted on the lower portion of the framework for circulation in one direction, the bucket means offering greater resistance to the water upon movement through the water in one direction than in the other direction whereby the series of bucket means circulates in the same direction both when rising under the influence of wave action on the buoyant body and when falling under the influence of wave action on the buoyant body, and means to convert the kinetic energy of the circulation of the series of bucket means into another form of energy.

2. An ocean wave energy converter according to claim 1, said series of bucket means circulating about a horizontal shaft driven in rotation thereby, and mechanical means for converting the rotary motion of the shaft to rotary motion of a member located on the buoyant body.

3. An ocean wave energy converter as claimed in claim 2, there being a vertical shaft mounted for rotation on said framework and having bevel gearing at its upper and lower ends, meshing with bevel gearing on said member and on said horizontal shaft, respectively.

4. An ocean wave energy converter as claimed in claim 1, said series of bucket means comprising a bucket wheel to which said bucket means are secured in a circular series.

* * * * *